United States Patent
Komori et al.

(10) Patent No.: US 6,662,159 B2
(45) Date of Patent: *Dec. 9, 2003

(54) RECOGNIZING SPEECH DATA USING A STATE TRANSITION MODEL

(75) Inventors: Yasuhiro Komori, Kawasaki (JP); Yasunori Ohora, Yokohama (JP); Masayuki Yamada, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/739,013

(22) Filed: Oct. 28, 1996

(65) Prior Publication Data

US 2001/0012994 A1 Aug. 9, 2001

(30) Foreign Application Priority Data

Nov. 1, 1995 (JP) .............................................. 7-285344

(51) Int. Cl.[7] ........................... G10L 15/14; G10L 15/18
(52) U.S. Cl. ......................................... 704/255; 704/258
(58) Field of Search ................................ 704/255–257, 704/200, 243

(56) References Cited

U.S. PATENT DOCUMENTS

| | | | | |
|---|---|---|---|---|
| 4,827,521 A | * | 5/1989 | Bahl et al. | .................... 704/256 |
| 4,833,712 A | * | 5/1989 | Bahl et al. | .................... 704/256 |
| 5,027,406 A | * | 6/1991 | Roberts et al. | ............. 704/256 |
| 5,199,077 A | * | 3/1993 | Wilcox et al. | .............. 704/256 |
| 5,220,629 A | | 6/1993 | Kosaka et al. | |
| 5,268,990 A | * | 12/1993 | Cohen et al. | ................ 704/256 |
| 5,381,514 A | | 1/1995 | Aso et al. | |
| 5,440,662 A | * | 8/1995 | Sukkar | ......................... 704/256 |
| 5,509,104 A | * | 4/1996 | Lee et al. | .................... 704/256 |
| 5,649,057 A | * | 7/1997 | Lee et al. | .................... 704/256 |
| 5,717,826 A | * | 2/1998 | Setlur et al. | ................. 704/256 |

OTHER PUBLICATIONS

Deller et al., "Discrete–Time Processing of Speech Signals," Prentice–Hall, Inc., 1987, pp. 677–683 and 720–727.*

* cited by examiner

Primary Examiner—David D. Knepper
(74) Attorney, Agent, or Firm—Fitzpatrick, Cella, Harper & Scinto

(57) ABSTRACT

Detecting an unknown word in input speech data reduces the search space and the memory capacity for the unknown word. For this purpose, an HMM data memory stores data describing a state transition mode for the unknown word, defined by a number of states and the transition probability between the states. An output probability calculation unit acquires a state of the maximum likelihood at each time of the speech data, among the plural states employed in the state transition mode for a known word, employed in the speech recognition of the known word. The obtained result is applied to the state transition mode for the unknown word, stored in the HMM data memory, to obtain a state transition mode of the unknown word. A different output probability calculation unit determines the likelihood of the state transition mode for the known word. Then a language search unit effects the language search process, utilizing the likelihoods determined by the aforementioned two output probability calculation units, in a portion where the presence of the unknown word is permitted by the dictionary.

22 Claims, 8 Drawing Sheets

FIG. 6

```
$TOKYO = TOOKYOO@ TOKYO ;
$YOKOHAMA = YOKOHAMA@ YOKOHAMA ;
$MICHIGO1 = GB@CHIMEI (PLACE-NAME) ;

$EKI = EKI@ STATION ;
$GINKO = GINKOO@ BANK
$MICHIGO2 = GB@ ZOKUSEI (ATTRIBUTE)

$chimei = ($TOKYO|$YOKOHAMA|$MICHIGO1) ;
$zokusei = ($EKI|$GINKO|$MICHIGO2) ;

$input = ($chimei $zokusei) ;

($input)
```

GB : UNKNOWN WORD PROCESSING

FIG. 8

| STATUS | 1 | 2 | 3 | ... | N |
|---|---|---|---|---|---|
| 1 | 0.95 | 0.05 | 0.05 | | 0.05 |
| 2 | 0.05 | 0.95 | 0.05 | | 0.05 |
| 3 | 0.05 | 0.05 | 0.95 | | 0.05 |
| : | : | : | : | | : |
| N | 0.05 | 0.05 | 0.05 | | 0.95 |

FIG. 9

| STATUS | 1 | 2 | 3 | ... | N |
|---|---|---|---|---|---|
| 1 | 0.72 | 0.03 | 0.01 | | 0.02 |
| 2 | 0.02 | 0.92 | 0.04 | | 0.01 |
| 3 | 0.01 | 0.23 | 0.64 | | 0.11 |
| : | : | : | : | | : |
| N | 0.02 | 0.00 | 0.00 | | 0.91 |

RECOGNIZING SPEECH DATA USING A STATE TRANSITION MODEL

BACKGROUND OF THE INVENTION

1. Field of the Invention

The present invention relates to a speech recognition method capable of processing input speech including an unknown word, and an apparatus and a computer controlled apparatus therefor.

2. Related Background Art

For processing an unanticipated input (hereinafter called an unknown word), there have mainly been proposed the following two methods:

(1) a method of detecting the unknown word by describing the train of phonemes and syllables as grammar, forming an HMM network according to the grammar, incorporating such network in the grammar for recognition, and multiplying the output probability by a penalty at the recognition; and (2) a method of studying a word, to be processed as the unknown word, in advance with various data, thereby preparing a garbage model;

and such methods have been used commonly and considered effective.

However, the method (1), though being capable of accepting any series of sounds as the unknown word, requires a considerable amount of Viterbi calculations for processing the unknown word and a considerable memory capacity therefor. Also in N-best speech recognition providing plural candidates of recognition, this method (1) describing the word by the chain of models may provide many candidates of the unknown word with different series of phonemes though this method can basically only provide information that the word is merely unknown for a given unknown word section, so that the N-best output may eventually become meaningless.

On the other hand, the method (2) only requires an increase in the amount of calculations and in the memory capacity corresponding to the ergodic model, and, providing only one candidate of the unknown word for the unknown word section, matches well with the N-best speech recognition generating plural candidates of recognition. It is, however, necessary to study the word, to be processed as the unknown word, by various data in advance, and the speech that does not appear in the data used in such study cannot be accepted.

Also, either method is defective, in consideration of the amount of calculations and the memory capacity required, in requiring the search process (trellis or Viterbi search), the search space (trellis space) therefor, and the special calculation of the output probability such as ergodic model.

SUMMARY OF THE INVENTION

Even in the case of the input of language speech information (an unknown word or an unnecessary word) that is other than the language information anticipated for input, the present invention allows the detection of such word, thereby reducing the search space (for example trellis space) for the unknown words and the memory therefor. As a result, there can be realized speech recognition of high performance with a function to process the unknown words, in a compact manner.

BRIEF DESCRIPTION OF THE DRAWINGS

FIG. 6 is a view showing the grammar for handling the unknown word in the embodiment;

FIGS. 8 and 9 are tables showing examples of data configuration in a state transition probability table in the embodiment.

DESCRIPTION OF THE PREFERRED EMBODIMENTS

Now the present embodiment will be clarified in detail, by a preferred embodiment thereof, with reference to the attached drawings.

Figure 1:
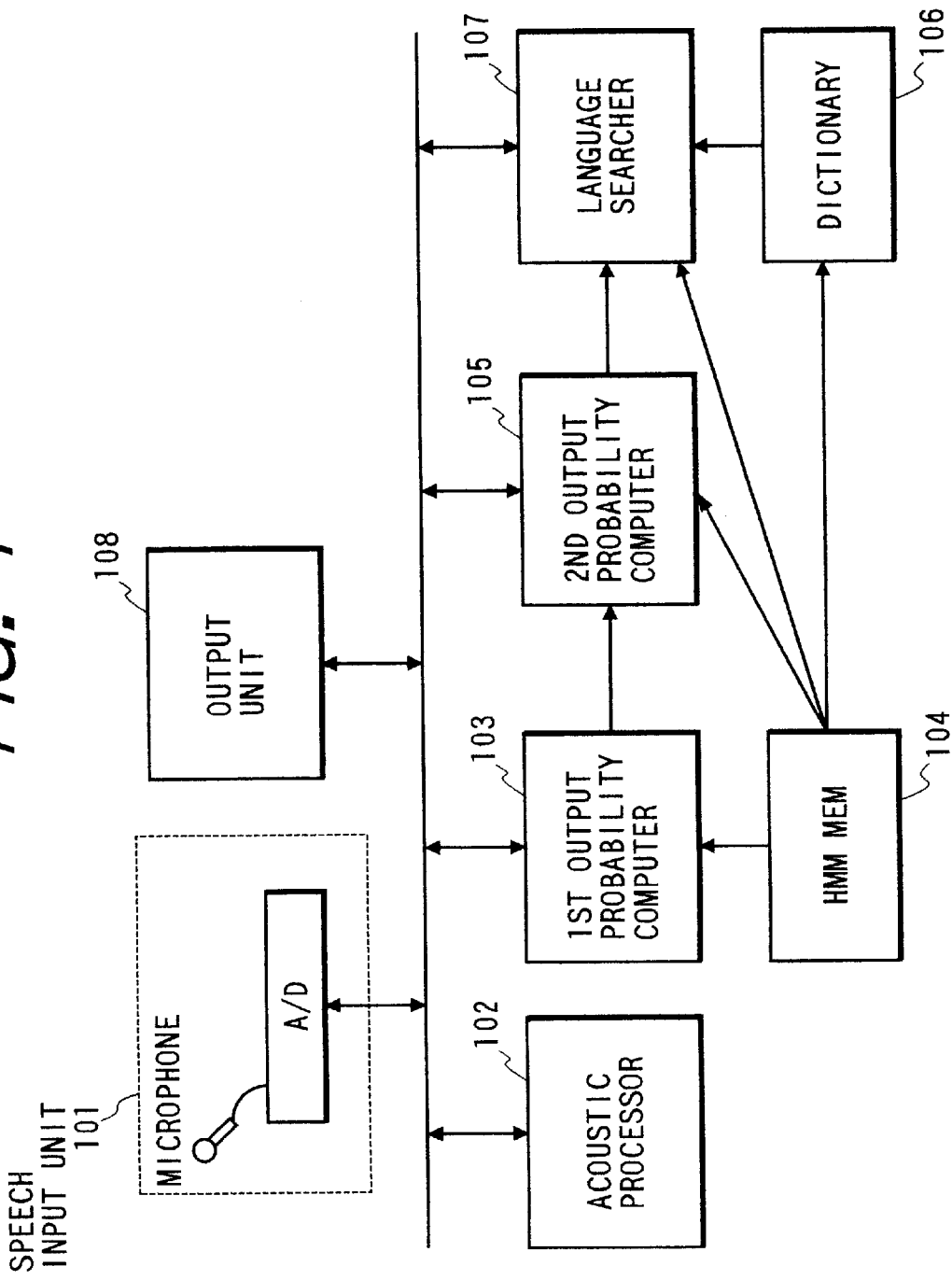
FIG. 1 is a view showing the configuration of a speech recognition apparatus embodying the present invention.

FIG. 1 is a view showing an example of the configuration of the speech recognition apparatus embodying the present invention, wherein provided are a speech input unit 101 provided for example with a microphone for converting input speech into an electrical signal (speech signal) and an A/D converter for converting such a speech signal into digital data; an acoustic analyzer 102 for determining speech parameters; a first output probability calculation unit 103 for calculating the output probability on a known word; a speech recognition model (HMM) 104; a second output probability calculation unit 105 for calculating the maximum output probability on an unknown word; a grammatical dictionary 106 to be used for the language processing; a language search unit 107 for effecting language processing; and a display or printing unit 108 for outputting the result of recognition in the form of a chain of characters. This output unit can be an output engine itself such as a CRT, a liquid crystal display, a laser printer or an ink jet printer, or a controller for controlling such an output device.

In the above-explained configuration, the acoustic analyzer 102, the first output probability calculation unit 103, the HMM memory 104 storing the HMM data, the second output probability calculation unit 105, the grammar dictionary 106 storing the grammatical data and the language search unit 107 may also be realized by the execution, by an unrepresented CPU, of a control program stored in an unrepresented memory. Also, such control program may be installed from another terminal for example, through a communication line, or stored in a detachable memory medium such as a CD-ROM and installed therefrom into a memory.

Figure 2:
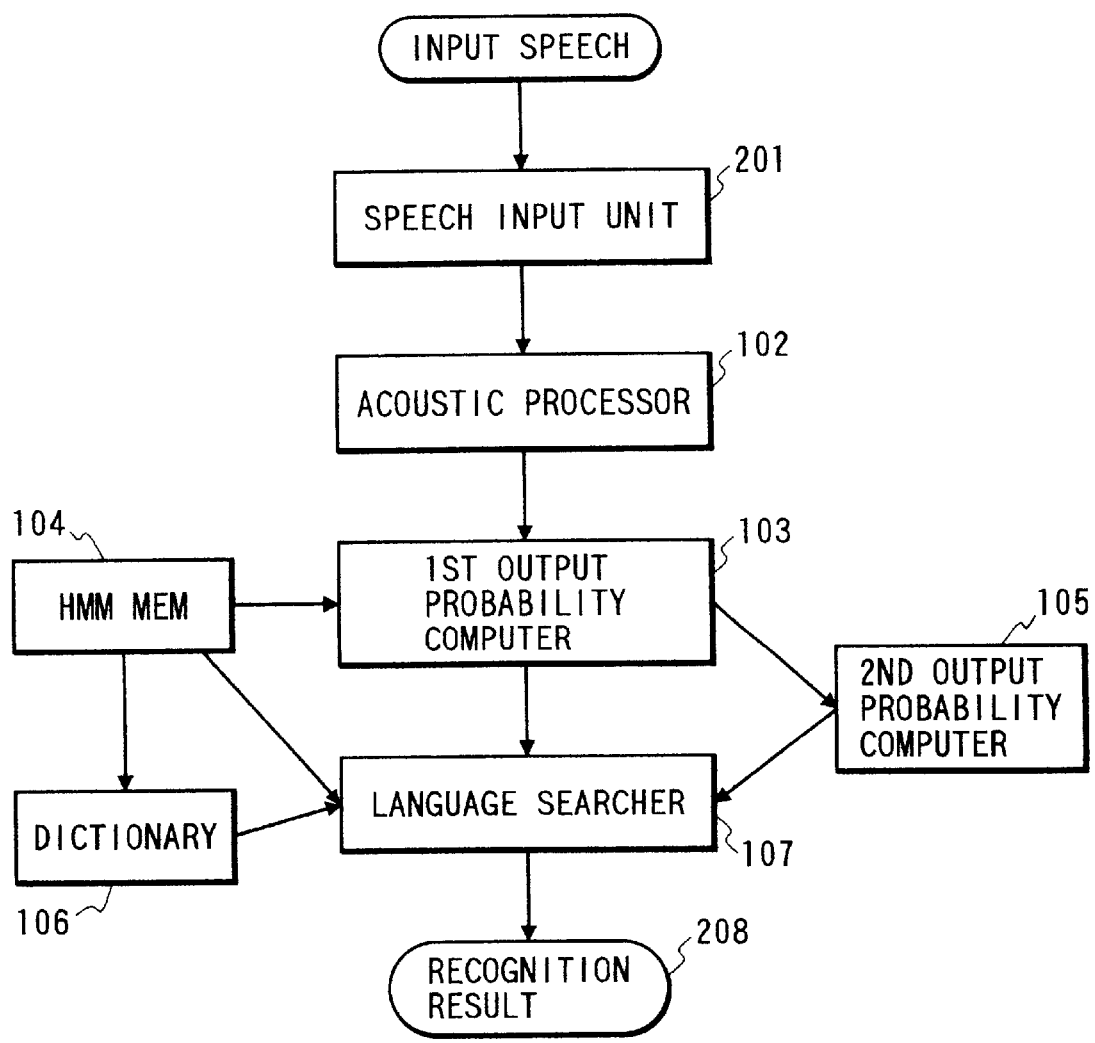
FIG. 2 is a block diagram showing the content of the process of the speech recognition apparatus in the above-mentioned embodiment.

In the following there will be explained the function of the speech recognition apparatus of the present embodiment, having the above-explained configuration. FIG. 2 is a block diagram showing the content of the process executed by the speech recognition apparatus of the present embodiment. A speech input unit 201 obtains a digital signal of the input speech by the speech input device 101, and divides silent sections and speech sections according to the characteristics of such digital signal, thereby extracting the speech sections. The speech extracted by the speech input unit 201 is analyzed, in the acoustic analyzer 102, into speech parameters for each frame. Subsequently, the output probability calculation unit 103 calculates the output probability, utilizing data stored in the HMM memory 104. In the HMM memory 104, there are registered HMM data of two kinds, namely HMM for speech recognition and HMM for unknown word processing (particularly number of states, state transitions and transition probability). The output probability calculation unit 103 determines the likelihood (output probability) on the known word, utilizing the HMM for speech recognition.

The calculation unit 105 for calculating the maximum output probability for processing the unknown word determines, for each frame, a state providing the maximum output probability and a value thereof, utilizing the HMM for processing the unknown word among the HMM data stored in the HMM memory 104.

The grammar/dictionary 106 registers language information describing information of the unknown word, in a part where the unknown word is likely to appear. The language search unit 107 effects the language search, utilizing such language information and the output probabilities determined in the first and second output probability calculation units 103, 105. As a result, a candidate of recognition and its likelihood are obtained, and a result 208 of recognition is outputted. In the present embodiment, the output of the result 208 of recognition is made by display on the display unit 108.

The operation in the above-mentioned first output probability calculation unit 103 is an ordinary calculation of the output probability on the known word, utilizing the HMM data, and will not, therefor, be explained in detail.

Figure 3:
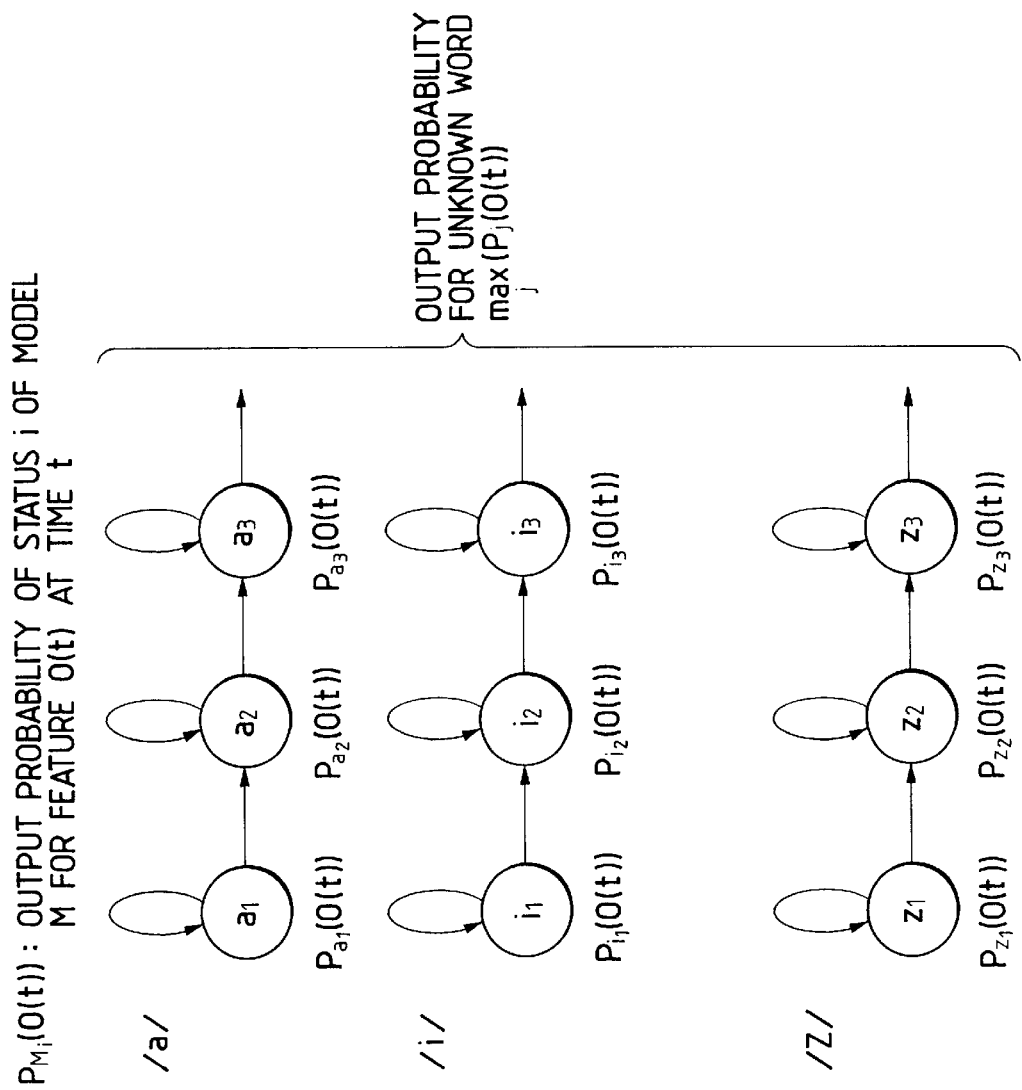
FIGS. 3 and 4 are views showing the concept of HMM for determining the output probability of the unknown word in the above-mentioned embodiment.
Figure 4:
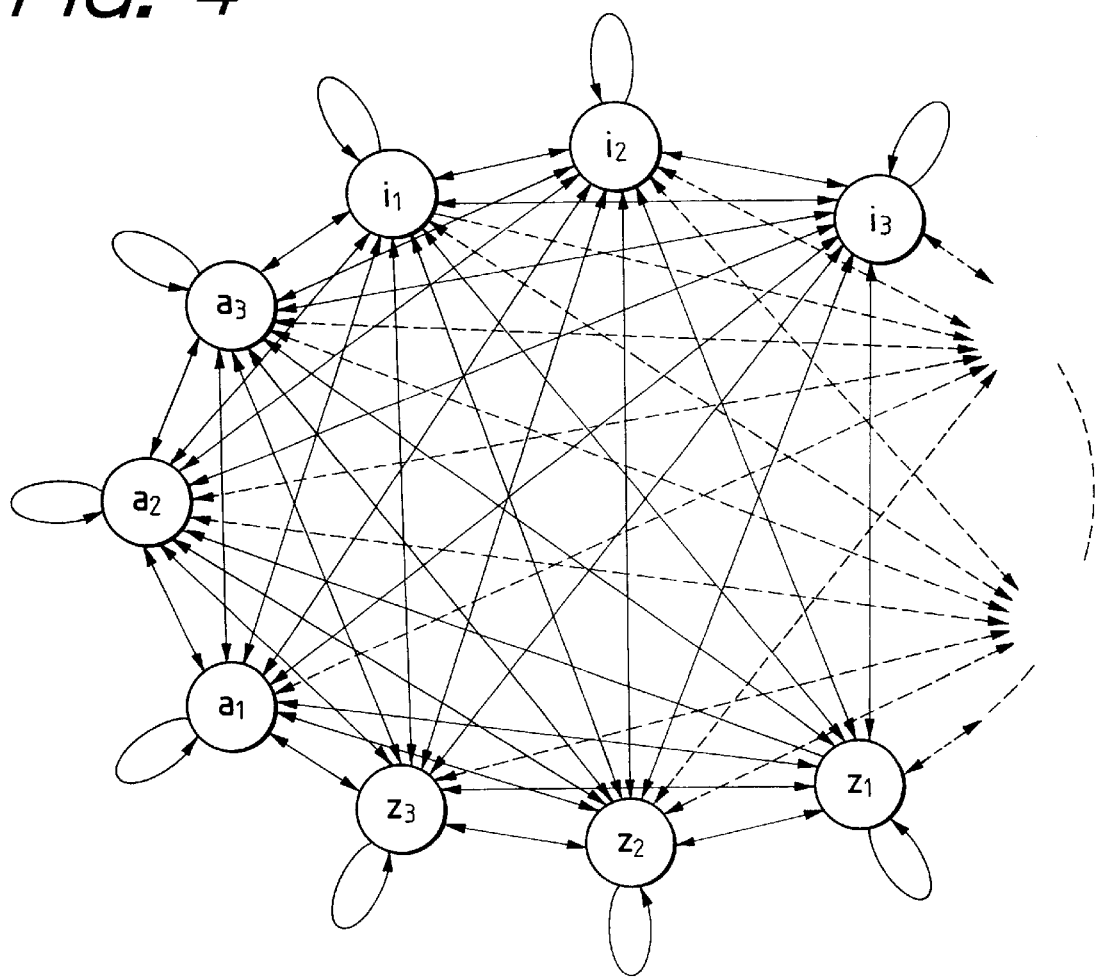

In the following there will be given an explanation on the process executed in the second output probability calculation unit 105, for calculating the maximum output probability for the unknown word. The calculation unit 105 determines, for each frame, a state providing the maximum output probability among the HMM data for unknown word processing and the value thereof. The frame mentioned above refers to a unit for processing with HMM, and is, for example a parameter of 10 ms. This parameter of the frame is defined as a length appropriately selected for each processing system. FIGS. 3 and 4 are views showing the concept of HMM for determining the output probability of the unknown word, in the present embodiment.

The processing of the unknown word in the present manner will now be explained. Basically it is constructed as a ergodic model of transition among all the HMM states of maximum output probability (hereinafter called MOPS (max output probability state transition model) method). In the following there will be explained the sequence of recognition of an unknown word in the present embodiment.

Figure 5:
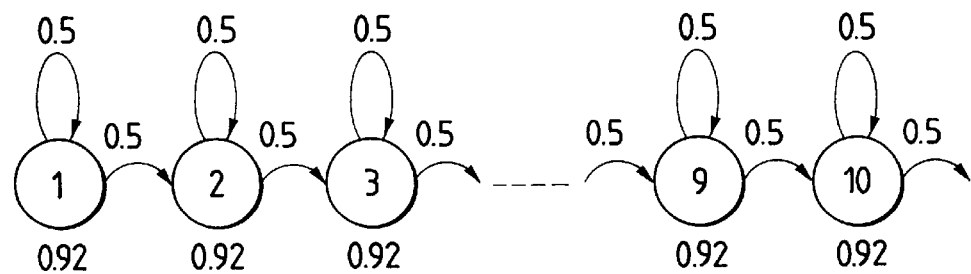
FIG. 5 is a view showing the state transition model for the unknown word.

(1) At first there are determined the number of states and the transition probability of the garbage model for MOPS. As an example, there are only assumed simple left-to-right self-loop transitions of 10 states. Then, a probability of state transition is suitably selected. As an example, the probability for the entire transitions is selected as 0.5. Also, there is suitably selected a penalty to be multiplied on the state output probability, for example as 0.92. FIG. 5 shows the configuration of a state transition model for the unknown word, determined in the above-explained manner.

(2) Then the description of the ergodic model is inserted in a portion of the recognition grammar, where the processing of the unknown word is desired. FIG. 6 shows the grammar for processing the unknown word in the present embodiment, in which the portion where the processing of the unknown word is desired is indicated by a model GR.

Figure 7:
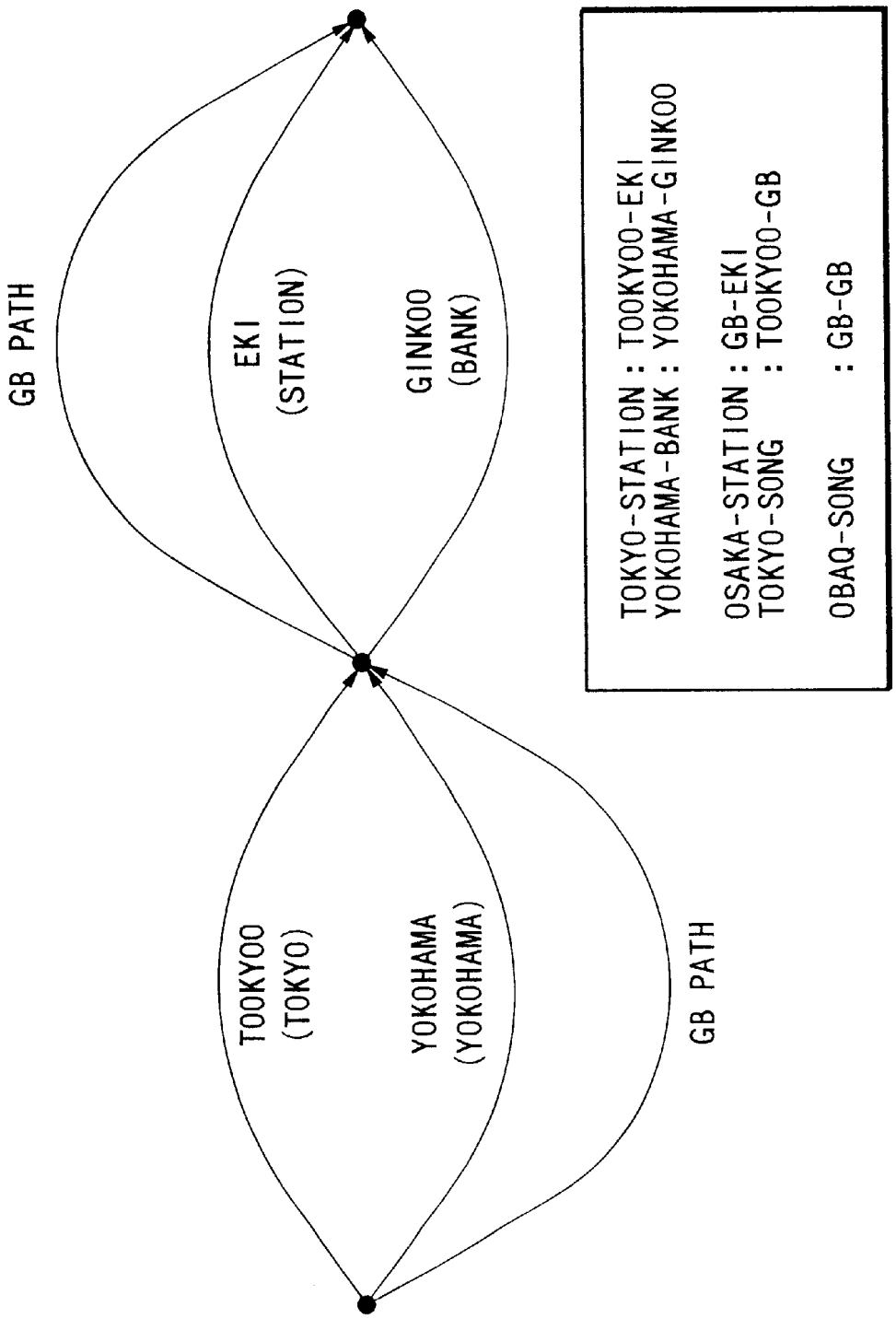
FIG. 7 is a view showing an example of the configuration of a recognition network in the embodiment.

(3) A network for recognition is constructed, utilizing the recognition grammar and the recognition HMM (including the garbage model). FIG. 7 shows an example of the configuration of the recognition network in the present embodiment, wherein paths are formed by the recognition grammar selected as shown in FIG. 6. More specifically, a path for the unknown word is formed corresponding to the portion of the unknown word "GB".

(4) The recognition process is executed by a Viterbi search, utilizing the above-explained recognition network and the input speech in the following manner.

(a) At first the likelihood of the states of the entire speech recognition HMM is found. The phoneme is in general formed by three states as shown in FIG. 3. For example, a phoneme a (/a/) is composed of three states a1, a2 and a3. In the present embodiment, there is determined the likelihood (output probability) of each state for the feature O(t) at a time t, disregarding the state transitions of the phoneme.

(b) Then the maximum likelihood of the states of the entire speech recognition HMM is found. More specifically, there is extracted a state having the maximum likelihood at each time, based on the likelihood of the states at each time, determined in the foregoing step (a).

(c) The unknown word model shown in FIG. 5 is prepared from the state of the maximum likelihood at each time extracted in the step (b), and the output probability of such unknown word model is calculated by multiplying the likelihood of each state by the transition probability (0.5 in the present embodiment). The output probability thus obtained is taken as that of the entire states of the ergodic model.

(d) The output probability of the unknown word is obtained by multiplying the output probability of the entire states of the ergodic model, determined in the step (c), by the penalty (0.92 in the present embodiment).

(e) The language search (for example Viterbi search) is executed, utilizing the output probability of the ergodic model determined in the step (d) and the HMM output probability for the known word. Such language search utilizing the output probability of the garbage model is conducted by the grammar/dictionary 106, in a portion where a path for the unknown word is given.

As explained in the foregoing, the present embodiment allows the processing of the unknown word by the MOPS method, through the simple procedure as explained above.

In general, the calculation of the HMM likelihood is conducted logarithmically, and the likelihood is given by the logarithmic probability sum. Consequently, it is conceivable to select the following value for the probability of state transition.

As an empirical method, it is conceivable to add log (0.95) in case of no change in the state (transition to a same state), and to add log (0.05) in case of transition to a different state. In such case, the state transition probability table assumes a form as shown in FIG. 8 (in exact sense it does not represent the probability).

There can also be conceived a method of decomposing all the HMM states, providing an initial value so as to allow free transitions among all the states while maintaining the interior which determines the output probability as fixed, and studying the state transition probability, utilizing the speech data after the HMM study. In this case, the transition probability can be studied by constructing a model as shown in FIG. 4 and effecting the study in an ordinary method. As a result of such study, there can be obtained a table of the state transition probability as exemplified in FIG. 9, and the likelihood is calculated with the logarithmic values in the table. The study can be made with the EM algorithm, which is ordinarily employed in the HMM studying process, with fixed parameters relating to the output probability.

The above-explained embodiment employs the HMM employing the phoneme as the unit, but there may naturally be employed any other unit.

In the foregoing embodiment, the state model of the unknown word is constructed by employing, as shown in FIG. 5, 10 states in a state model in which a phoneme is composed of three states as shown in FIG. 3. Consequently the unknown word has to be constructed with about three phonemes or more, and a speech of less number of phonemes is not recognized as an unknown word. Naturally the above-mentioned number of states is merely an example, and the state model of the unknown word may be constructed with another number of states.

The object of the present invention, attained by the function of the above-explained apparatus or method, can also be attained by a memory medium storing a program which causes an unrepresented CPU to execute the process of the above-explained embodiment. More specifically, such memory medium itself can attain the novel function of the present invention, when such memory medium (for example a floppy disk) is mounted on the above-mentioned apparatus and the program read from the memory medium is executed by the CPU. The program of the present invention for this purpose has structural features as shown in FIGS. 10A and 10B.

Figure 10A:
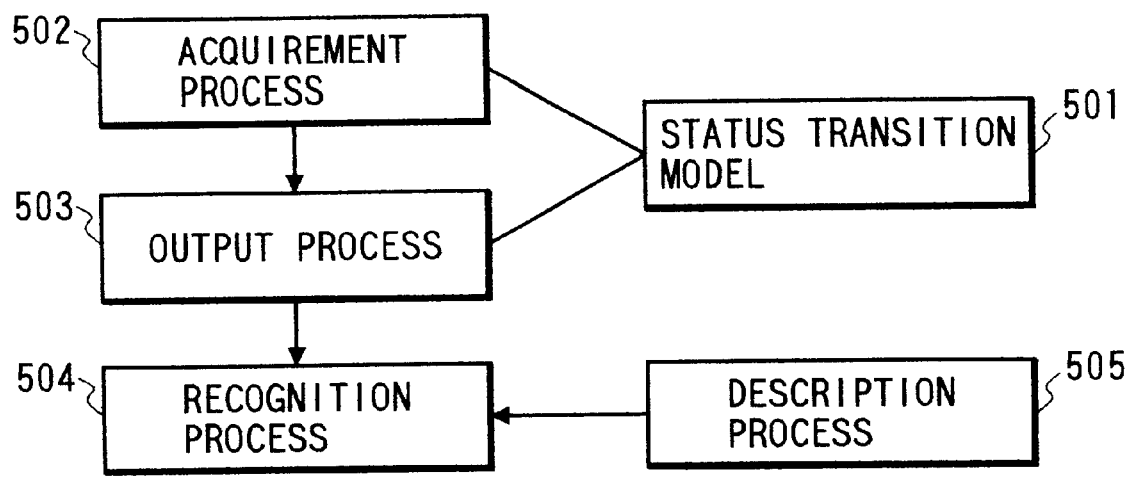
FIGS. 10A and 10B are views showing the configuration of a memory medium storing a control program for realizing the control of the embodiment.
Figure 10B:
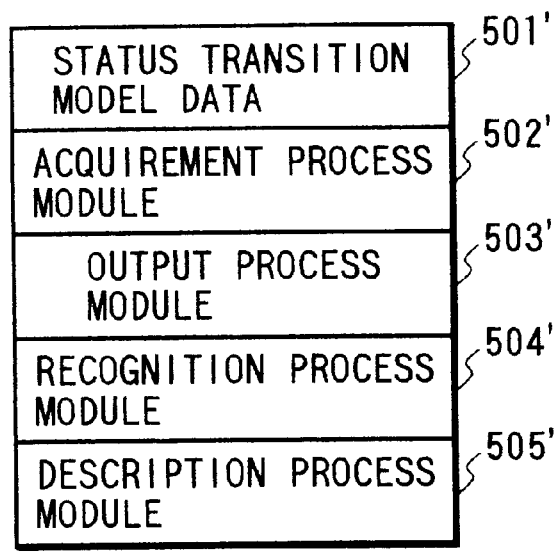

FIG. 10A shows the process sequence of the above-mentioned program, wherein data 501 of the state transition model, corresponding to the HMM 104 describing the state transition model for the unknown word, defined by the number of states and the transition probability between the states, and the state transition model for the known word. An acquisition process 502 acquires a state of the maximum likelihood, at each time of the speech data, among the plural states employed in the state transition model for the known word, used in the speech recognition of the known word. This corresponds to the process of determining the maximum output probability of the unknown word in the aforementioned 2nd output probability calculation unit 105.

An output process 503 acquires the likelihood for the above-mentioned state transition model for the speech data, obtained by applying the state acquired in the acquisition process 502 to the state transition model for the unknown word, and outputs such likelihood as that of the unknown word. As a result, the 2nd output probability calculation unit 105 releases a state model of the unknown word with the maximum output probability.

A recognition process 504 effects recognition of the above-mentioned speech data, utilizing the likelihood obtained with the state transition model for the known word and the above-mentioned likelihood for the unknown word. This process corresponds to the process by the language search unit 107, which effects language search based on the likelihood of the state transition model of the known word obtained in the 1st output probability calculation unit 103 and that of the state transition model of the unknown word obtained in the 2nd output probability calculation unit 105.

Also, a description process 505 describes information, indicating a portion where the unknown word can be present, in a manner as shown in FIG. 6, in the grammar/dictionary 106 representing the limitation in language of the object of recognition. Then, the above-mentioned recognition process 504 executes a language search including the likelihood of the unknown word, in the portion where the grammar/dictionary 106 indicates the possibility of the presence of the unknown word. More specifically, a description indicating the presence of an unknown word (for example "$MICHIGO=GB@place-name") generates a path for the unknown word, in the search network of the language search unit 107, as shown in FIG. 7. The processing of the unknown word is rendered possible by the language search utilizing such search network. In the above-mentioned example, a word MICHIGO is given to mean "unknown word".

FIG. 10B is a memory map showing the arrangement of the program modules for realizing the processes explained above. The state transition model 501 is provided from state transition model data 501'. Also the acquisition process 502, the output process 503, the recognition process 504 and the description process 505 are respectively realized by an acquisition process module 502', an output process module 503', a recognition process module 504', and a description process module 505'.

The present invention is applicable not only to a system consisting of plural equipment but also to an apparatus consisting solely of an equipment. If is naturally applicable also to a case where the present invention is achieved by the supply of a program to a system or an apparatus. In such case, a memory medium storing the program relating to the present invention constitutes the present invention, and such system or apparatus functions in a predetermined manner, by reading such program from the memory medium into the system or the apparatus.

What is claimed is:

1. A recognition apparatus for recognizing speech data by comparing an unknown word in speech data with data of known words without learning a model for recognition, comprising:

obtaining means for obtaining a state having the maximum likelihood for each part of the speech data, from plural states employed in a state transition model for known words, to be employed in speech recognition of known words;

ergodic model preparation means for preparing an ergodic model of an unknown word from the obtained states having the maximum likelihood, the obtained states being numbered in a description inserted in a portion where a processing for the unknown word is desired in a recognition grammar;

calculation means for calculating a likelihood for an unknown word in the speech data by multiplying the maximum likelihood of each state by a transition probability commonly used for the entire transitions in unknown words; and recognition means for effecting recognition of said speech data based on the likelihood calculated by the calculation means.

2. A recognition apparatus according to claim 1, wherein said state transition model for the unknown word is described by left-to-right and self-loop state transitions.

3. A recognition apparatus according to claim 1, wherein, in said state transition model for the unknown word, all the transitions to other states have a same transition probability.

4. A recognition apparatus according to claim 1, further comprising a dictionary indicating a language restriction of the object of recognition and also indicating a portion where the unknown word may exist;

wherein said recognition means is adapted to effect, in a portion where said dictionary indicates the possibility of the existence of the unknown word, a language search process including the state transition model and the likelihood for the unknown word.

5. A recognition apparatus according to claim 1, further comprising a table storing the transition probabilities among the states in said state transition model for the unknown word.

6. A recognition apparatus according to claim 5, wherein, in said table, the transition probability in the case of a transition to the same state is different from that in the case of a transition to a different state.

7. A recognition apparatus according to claim 5, further comprising study means for varying the transition probabilities store in said table, by performing a study of the transition probabilities.

8. A recognition apparatus according to claim 1, wherein said speech data is entered by a microphone.

9. A recognition apparatus according to claim 1, further comprising recognition result output means for outputting the result of recognition by said recognition means, in the form of a train of characters.

10. A recognition apparatus according to claim 9, wherein said recognition result output means is an ink jet printer.

11. A recognition method for recognizing speech data by comparing an unknown word in speech data with data of known words without learning a model for recognition, comprising:

an obtaining step of obtaining a state having the maximum likelihood for each part of the speech data, from plural states employed in a state transition model for known words, to be employed in speech recognition of known words;

an ergodic model preparation step of preparing an ergodic model of an unknown word from the obtained states having the maximum likelihood, the obtained states being numbered in a description inserted in a portion where a processing for the unknown word is desired in a recognition grammar;

a calculation step of calculating a likelihood for an unknown word in the speech data by multiplying the maximum likelihood of each state by a transition probability for the entire transitions in unknown words; and a recognition step of effecting recognition of said speech data based on the likelihood calculated by the calculation means.

12. A recognition method according to claim 11, wherein said state transition model for the unknown word is described by left-to-right and self-loop state transitions.

13. A recognition method according to claim 11, wherein, in said state transition model for the unknown word, all the transitions to other states have a same transition probability.

14. A recognition method according to claim 11, further comprising a step of describing, in a dictionary indicating a language restriction of the object of recognition, information indicating a portion where the unknown word may exist;

wherein said recognition step is adapted to effect, in a portion where said dictionary indicates the possibility of the existence of the unknown word, a language search process including the state transition model and the likelihood for the unknown word.

15. A recognition method according to claim 11, further comprising a table storing the transition probabilities among the states in said state transition model for the unknown word.

16. A recognition method according to claim 15, wherein, in said table, the transition probability in the case of a transition to the same state is different from that in the case of a transition to a different state.

17. A recognition method according to claim 15, further comprising a study step of varying the transition probabilities store in said table, by performing a study of the transition probabilities.

18. A recognition method according to claim 11, wherein said speech data is entered by a microphone.

19. A recognition method according to claim 11, further comprising a recognition result output step of outputting the result of recognition by said recognition step, in the form of a train of characters.

20. A recognition method according to claim 19, wherein said recognition result output step is adapted to output the result of recognition by an ink jet printer engine.

21. A computer controlled apparatus for effecting a speech recognition process by reading a predetermined program from a memory medium and comparing an unknown word in speech data with data of known words without learning a model for recognition, wherein said memory medium comprises:

a first process code for causing the computer controlled apparatus to obtain a state having maximum likelihood for each part of the speech data, from plural states employed in a state transition model for known words, to be employed in speech recognition of known words;

a second process code for causing the computer controlled apparatus to prepare an unknown word from the obtained states having the maximum likelihood, the obtained states being numbered in a description inserted in a portion where a processing for the unknown word is desired in a recognition grammar;

a third process code for causing the computer controlled apparatus to calculate a likelihood for an unknown word in the speech data by multiplying the maximum likelihood of each state by a transition probability commonly used for the entire transition in unknown words; and a fourth process code for causing the computer controlled apparatus to effect recognition of said speech data based on the likelihood calculated by the calculation means.

22. A computer controlled apparatus according to claim 21, wherein said third code further comprises a fourth process code for causing the computer controlled apparatus to effect a language search process including the state transition model and the likelihood for the unknown word in a portion of a dictionary where said dictionary indicates the possibility of the existence of the unknown word, the dictionary indicating a language restriction of the object of recognition.

* * * * *

UNITED STATES PATENT AND TRADEMARK OFFICE
CERTIFICATE OF CORRECTION

PATENT NO. : 6,662,159 B2
DATED : December 9, 2003
INVENTOR(S) : Yasuhiro Komori et al.

It is certified that error appears in the above-identified patent and that said Letters Patent is hereby corrected as shown below:

Column 1,
Line 23, "a garbage model" should read -- an ergodic model --.

Column 3,
Line 48, "a ergodic" should read -- an ergodic --.
Line 55, "garbage model" should read -- ergodic model --.

Column 4,
Lines 5 and 43, "garbage model" should read -- ergodic model --.

Column 5,
Line 14, "Consequently" should read -- Consequently, --.

Column 6,
Line 26, "If is" should read -- It is --.

Column 7,
Line 16, "store in" should read -- stored in --.

Column 8,
Line 13, "store in" should read -- stored in --.

Signed and Sealed this

Twenty-eighth Day of September, 2004

JON W. DUDAS
*Director of the United States Patent and Trademark Office*